US011558101B2

United States Patent
Nam et al.

(10) Patent No.: US 11,558,101 B2
(45) Date of Patent: Jan. 17, 2023

(54) METHODS AND APPARATUS TO FACILITATE SYMBOL EXTENSION AND WINDOWING FOR BEAM SWITCHING

(71) Applicant: QUALCOMM Incorporated, San Diego, CA (US)

(72) Inventors: Wooseok Nam, San Diego, CA (US); Xiaoxia Zhang, San Diego, CA (US); Tao Luo, San Diego, CA (US); Jing Sun, San Diego, CA (US); Juan Montojo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 4 days.

(21) Appl. No.: 17/209,155

(22) Filed: Mar. 22, 2021

(65) Prior Publication Data

US 2021/0306063 A1    Sep. 30, 2021

Related U.S. Application Data

(60) Provisional application No. 62/994,237, filed on Mar. 24, 2020.

(51) Int. Cl.
*H04B 7/08* (2006.01)
*H04L 27/26* (2006.01)
*H04W 8/24* (2009.01)
*H04W 16/28* (2009.01)

(52) U.S. Cl.
CPC ....... *H04B 7/0888* (2013.01); *H04L 27/2607* (2013.01); *H04W 8/24* (2013.01); *H04W 16/28* (2013.01)

(58) Field of Classification Search
CPC .............. H04B 7/0888; H04L 27/2607; H04L 27/26025; H04W 8/24; H04W 16/28
USPC ........................................................ 370/329
See application file for complete search history.

(56) References Cited

U.S. PATENT DOCUMENTS

2017/0156108 A1\*   6/2017   Kim ...................... H04W 48/12
2019/0349949 A1    11/2019   Bai et al.
2019/0363919 A1    11/2019   Bai et al.

FOREIGN PATENT DOCUMENTS

WO    WO-2017151876 A1 \*    9/2017    ........... H04B 7/0408
WO    WO-2021162595 A1 \*    8/2021

OTHER PUBLICATIONS

International Search Report and Written Opinion—PCT/US2021/023708—ISA/EPO—dated Sep. 13, 2021.
Partial International Search Report—PCT/US2021/023708—ISA/EPO—dated Jun. 29, 2021.

(Continued)

*Primary Examiner* — Rownak Islam
(74) *Attorney, Agent, or Firm* — Procopio, Cory, Hargreaves & Savitch LLP

(57) ABSTRACT

Apparatus, methods, and computer-readable media for facilitating symbol extension and windowing for beam switching are disclosed herein. An example method for wireless communication at transmitter includes performing a beam change for communicating with a wireless communication device. The example method also includes extending a transmission for an extended period of time based on the beam change. Additionally, the method includes applying a windowing function to the transmission during the extended period of time.

28 Claims, 11 Drawing Sheets

(56) References Cited

OTHER PUBLICATIONS

Samsung: "Numerology and Frame Structure for 5G New Radio Interface: Over-6GHz", 3GPP Draft, 3GPP TSG RAN WG1 Meeting #84bis, R1-163536, R1-162180, A6GHZ_Numerology and Framestructure_Samsung, 3rd Generation Partnership Project (3GPP), Mobile Competence Centre, 650, Route Des Lucioles, F-06921, Sophia-Antipolis Cedex, France, vol. RAN WG1, No. Busan, Korea; Apr. 11, 2016-Apr. 15, 2016, Apr. 18, 2016 (Apr. 18, 2016), XP051097120, 5 pages, URL: http://www.3gpp.org/ftp/tsg_ran/WG1_RL1/TSGR1_84b/Docs/[retrieved on Apr. 18, 2016] pp. 1-3.

* cited by examiner

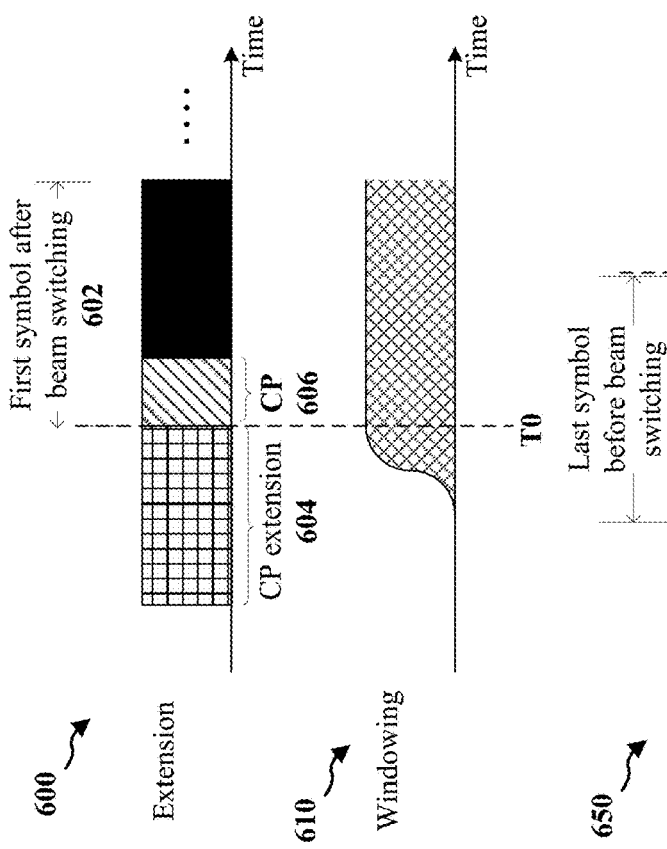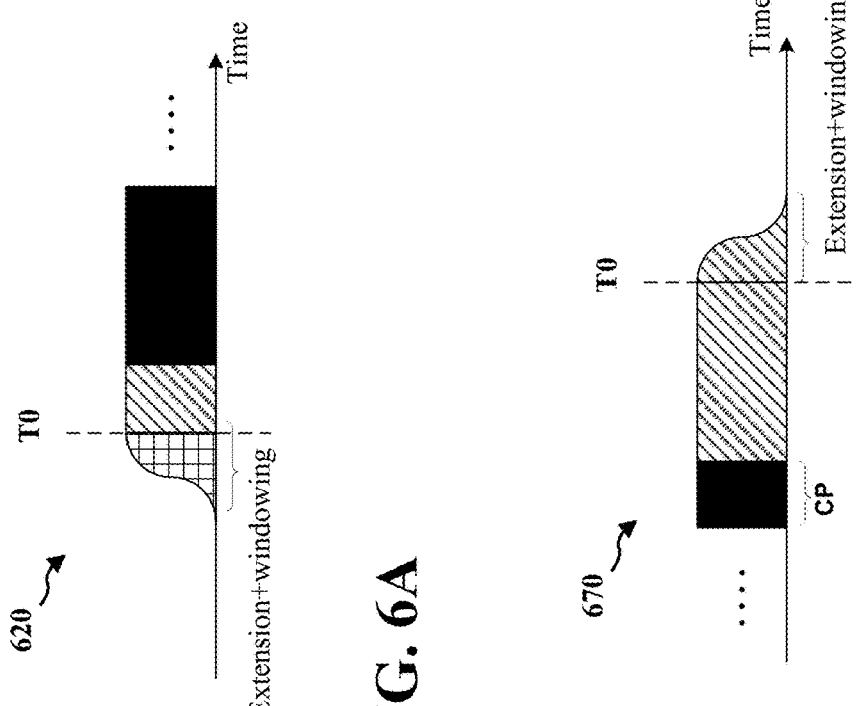
FIG. 6A
FIG. 6B

METHODS AND APPARATUS TO FACILITATE SYMBOL EXTENSION AND WINDOWING FOR BEAM SWITCHING

CROSS REFERENCE TO RELATED APPLICATION(S)

This application claims the benefit of U.S. Provisional Patent Application Ser. No. 62/994,237, entitled "Methods and Apparatus to Facilitate Symbol Extension and Windowing for Beam Switching," and filed on Mar. 24, 2020, which is expressly incorporated by reference herein in its entirety.

BACKGROUND

Technical Field

The present disclosure relates generally to communication systems, and more particularly, to communication systems utilizing beam switching.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided for wireless communication at a transmitter. An example apparatus performs a beam change for communicating with a wireless communication device. The example apparatus also extends a transmission for an extended period of time based on the beam change. Further, the example apparatus applies a windowing function to the transmission during the extended period of time.

In another aspect of the disclosure, a method, a computer-readable medium, and an apparatus are provided for wireless communication at a base station. An example apparatus receives an indication of a transmitter capability of a wireless communication device, wherein the transmitter capability comprises at least one of a beam switching capability for the wireless communication device or a Radio Frequency (RF) front end capability for the wireless communication device. The example apparatus also configures the wireless communication device for one or more of a length of a symbol extension or a shape of a windowing function for the wireless communication device to apply when performing a beam change.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 6A depicts an example transmission on which symbol extension and windowing is performed for one or more symbols after a beam change, in accordance with one or more techniques disclosed herein.

FIG. 6B depicts an example transmission on which symbol extension and windowing is performed for one or more symbols before a beam change, in accordance with one or more techniques disclosed herein.

DETAILED DESCRIPTION

Figure 1:
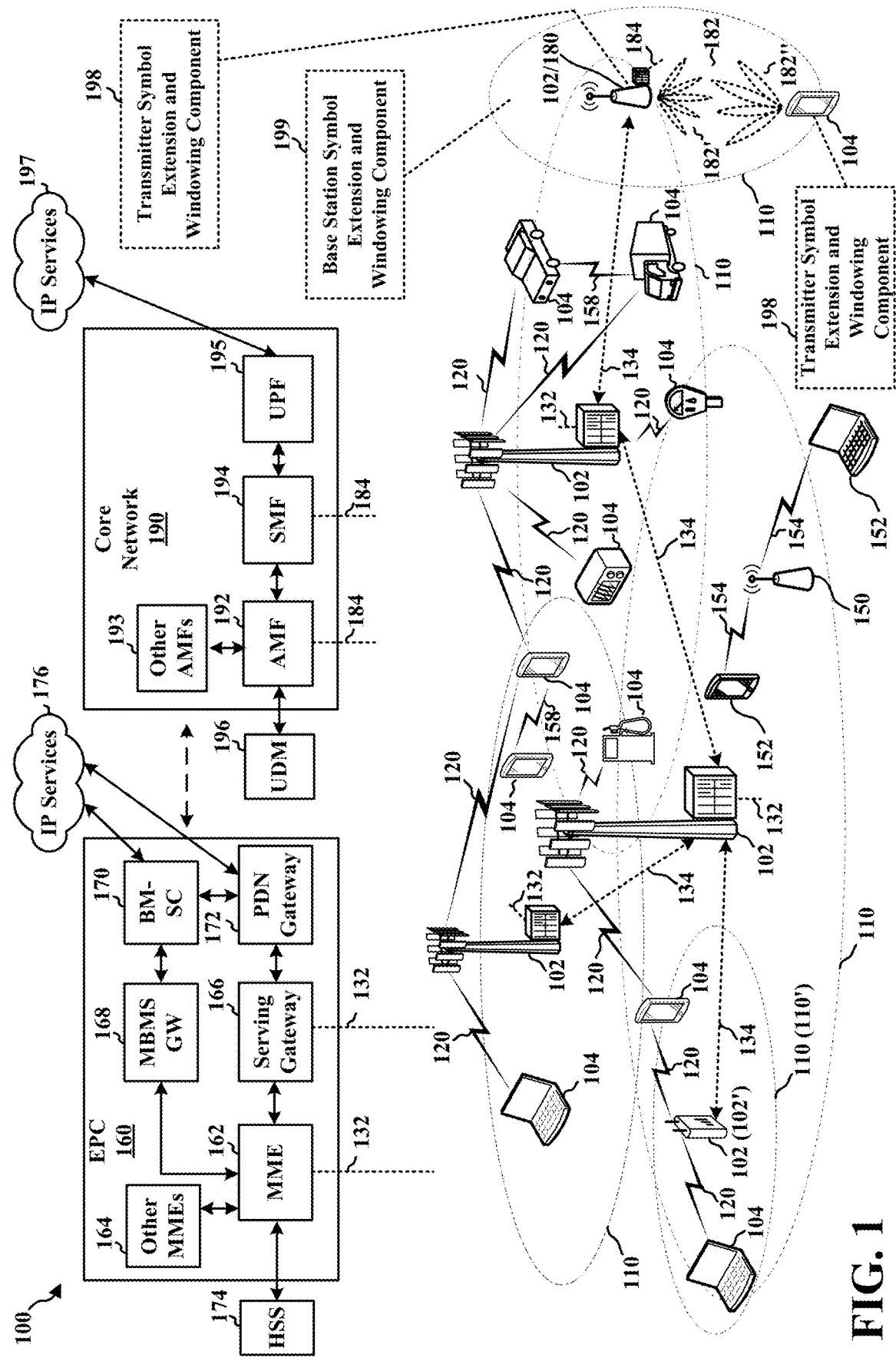
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example aspects, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

As used herein, the term computer-readable medium is expressly defined to include any type of computer readable storage device and/or storage disk and to exclude propagating signals and to exclude transmission media. As used herein, "computer-readable medium," "machine-readable medium," "computer-readable memory," and "machine-readable memory" may be used interchangeably.

FIG. 1 is a diagram illustrating an example of a wireless communications system and an access network 100 including base stations 102 or 180 and UEs 104.

In some examples, a transmitter, such as a UE 104 and/or a base station 102/180, may perform a beam switch (sometimes referred to as a "beam change") to facilitate switching from a first beam to a second beam. For example, the transmitter may determine to switch from a first transmit beam to a second transmit beam, may determine to switch from a transmit beam to a receive beam, may determine to switch from a receive beam to a transmit beam, or may determine to switch from a first receive beam to a second receive beam.

When the transmitter performs a beam switch, the transmitter may incur a delay. For example, performing analog beam switching includes the transmitter receiving and decoding control information, re-programming RF software and/or firmware, and retuning of RF front ends of the transmitter.

In some examples, when the transmitter is performing a beam switch, the RF front end of the transmitter may be in an undetermined state and there may be residual signaling. For example, there may be residual radiation associated with some RF emission. In some examples, the residual radiation may lead to out-of-band emission and to adjacent-channel interference. For example, adjacent-channel interference may be caused by extraneous power from a signal in an adjacent channel (e.g., when changing from a first beam to a second beam). Adjacent channel leakage ratio (ACLR) (sometimes referred to as "harmonic distortion") may also increase due to the out-of-band emissions.

Example aspects disclosed herein provide techniques for reducing residual radiation when performing beam switching by employing symbol extension and windowing. For example, when a transmitter is performing beam switching, disclosed techniques extend a transmission for an extended period of time and shape the extended transmission during the extended period of time by applying a windowing function to the extended transmission. In some examples, the transmitter may extend the transmission for one or more symbols after a beam change. In some examples, the transmitter may extend the transmission for one or more symbols before a beam change. In some examples, the beam change may be an uplink beam change between transmissions of two different channels, such as PUSCH, SRS, and/or PUCCH.

As an example, in certain aspects, a transmitter, such as a UE 104 and/or a base station 102/180, may include a transmitter symbol extension and windowing component 198 to manage one or more aspects of wireless communication via low spectral regrowth during beam switching. The example transmitter symbol extension and windowing component 198 may be configured to perform a beam change for communicating with a wireless communication device. The example transmitter symbol extension and windowing component 198 may also be configured to extend a transmission for an extended period of time based on the beam change. Further, the example transmitter symbol extension and windowing component 198 may be configured to apply a windowing function to the transmission during the extended period of time.

Still referring to FIG. 1, in certain aspects, the base station 180 may be configured to manage one or more aspects of wireless communication via low spectral regrowth during beam switching. As an example, in FIG. 1, the base station 180 may include a base station symbol extension and windowing component 199 configured to receive an indication of a transmitter capability of a wireless communication device, wherein the transmitter capability comprises at least one of a beam switching capability for the wireless communication device or a Radio Frequency (RF) front end capability for the wireless communication device. The example base station symbol extension and windowing component 199 may also be configured to configure the wireless communication device for one or more of a length of a symbol extension or a shape of a windowing function for the wireless communication device to apply when performing a beam change.

Although the following description provides examples directed to uplink communications, the concepts described herein may be applicable to downlink communications and/or sidelink communications. Furthermore, while the following description provides examples directed to 5G NR, the concepts described herein may be applicable to other similar areas, such as LTE, LTE-A, CDMA, GSM, and/or other wireless technologies, in which residual radiation may occur due to beam switching. Additionally, while the following description provides examples directed to licensed band operation, the concepts described herein may be applicable to unlicensed band operation and/or other band operations for which listen-before-talk techniques are applied.

The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Figure 2:
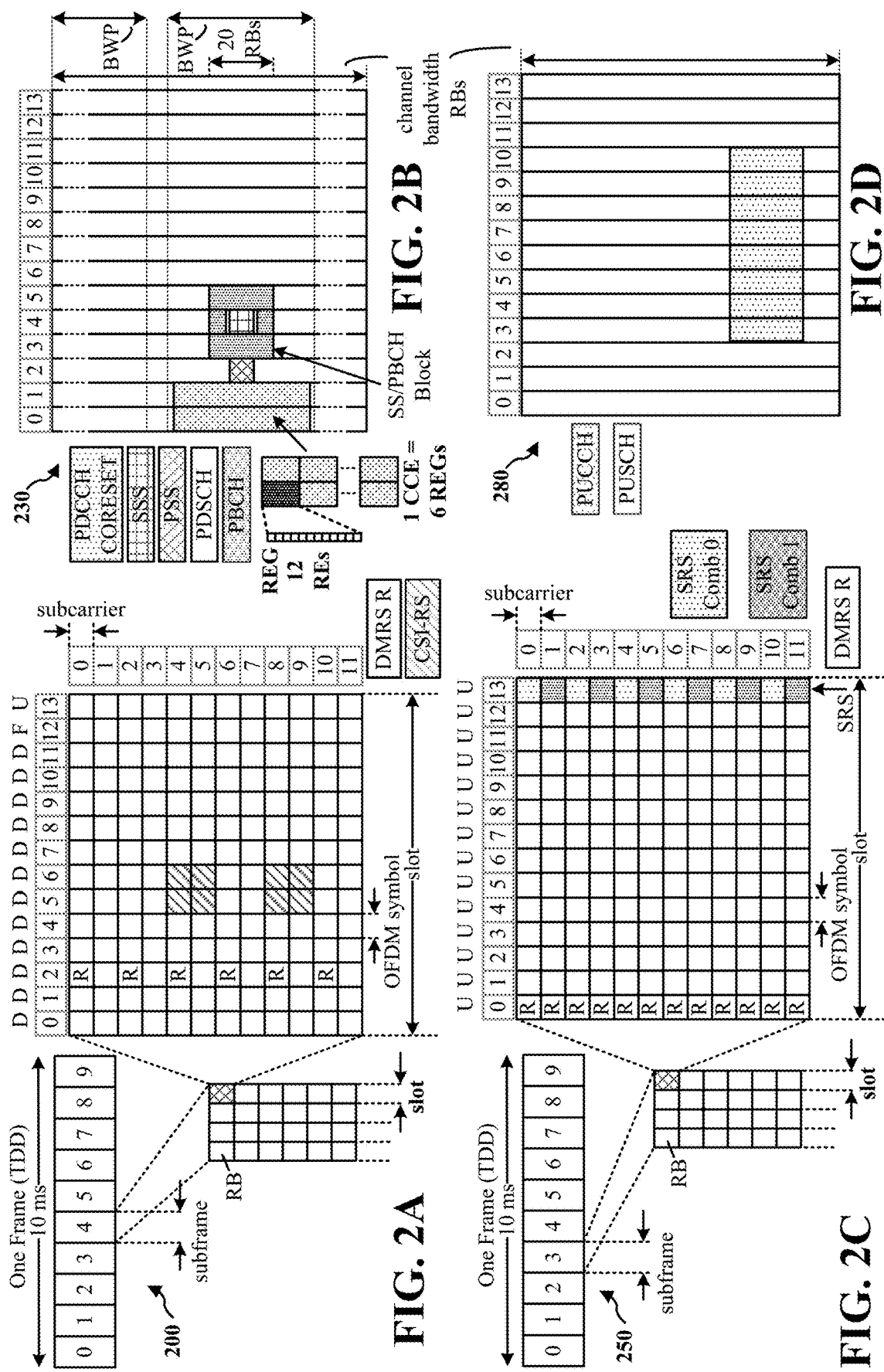
FIG. 2A is a diagram illustrating an example of a first frame, in accordance with various aspects of the present disclosure.
FIG. 2B is a diagram illustrating an example of DL channels within a subframe, in accordance with various aspects of the present disclosure.
FIG. 2C is a diagram illustrating an example of a second frame, in accordance with various aspects of the present disclosure.
FIG. 2D is a diagram illustrating an example of UL channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu$ 0 to 4 allow for 1, 2, 4, 8, and 16 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2^\mu$ slots/subframe. The subcarrier spacing and symbol length/duration are a function of the numerology. The subcarrier spacing may be equal to $2^\mu*15$ kHz, where $\mu$ is the numerology 0 to 4. As such, the numerology $\mu$=0 has a subcarrier spacing of 15 kHz and the numerology $\mu$=4 has a subcarrier spacing of 240 kHz. The symbol length/duration is inversely related to the subcarrier spacing. FIGS. 2A-2D provide an example of slot configuration 0 with 14 symbols per slot and numerology $\mu$=2 with 4 slots per subframe. The slot duration is 0.25 ms, the subcarrier spacing is 60 kHz, and the symbol duration is approximately 16.67 µs. Within a set of frames, there may be one or more different bandwidth parts (BWPs) (see FIG. 2B) that are frequency division multiplexed. Each BWP may have a particular numerology.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) information (ACK/negative ACK (NACK)) feedback. The PUSCH carries data, and may additionally be used to carry a buffer status report (BSR), a power headroom report (PHR), and/or UCI.

Figure 3:
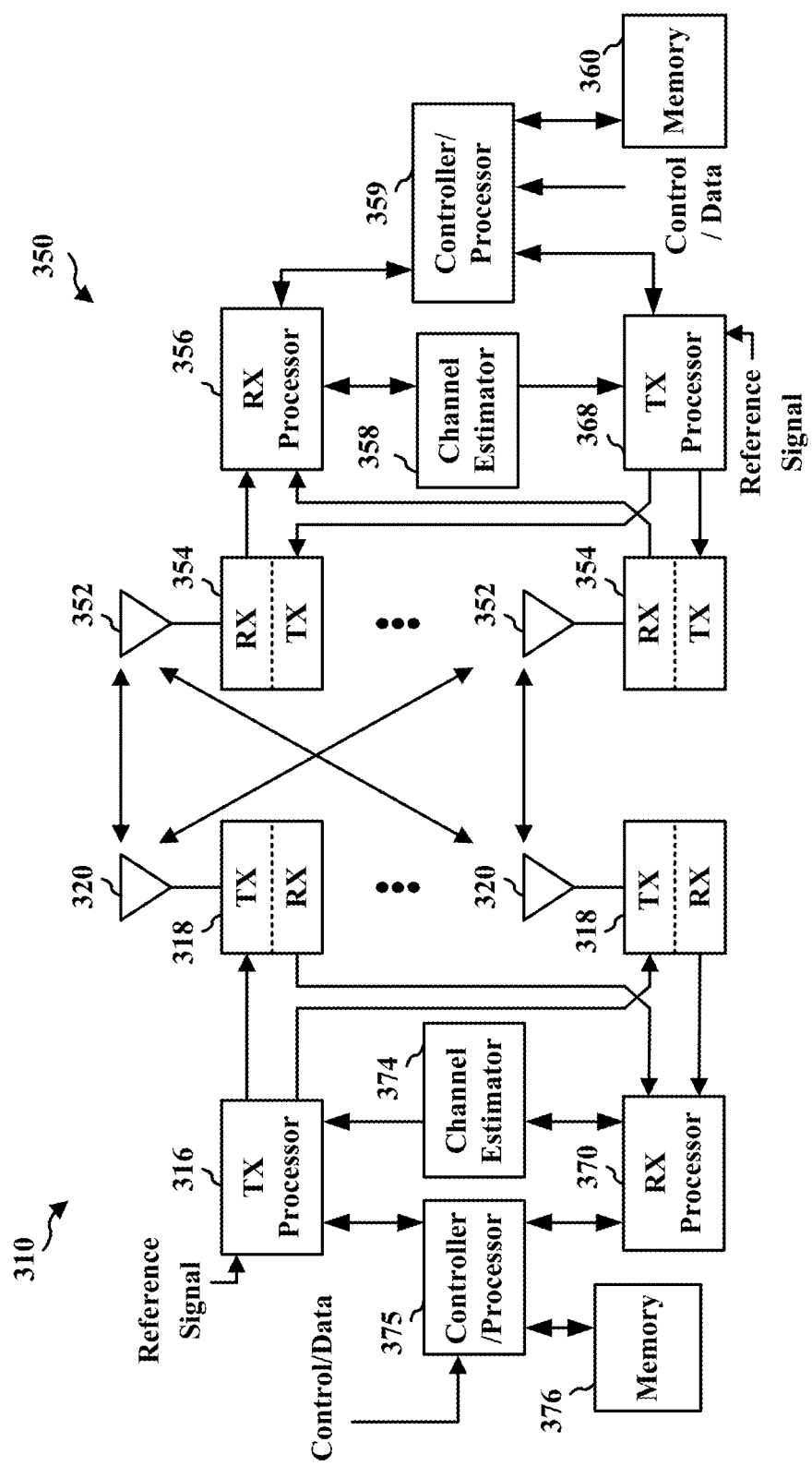
FIG. 3 is a diagram illustrating an example of a base station and a user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor (e.g., a TX processor 316) and the receive (RX) processor (e.g., an RX processor 370) implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate an RF carrier with a respective spatial stream for transmission.

At the UE 350, each receiver 354 RX receives a signal through its respective antenna 352. Each receiver 354 RX recovers information modulated onto an RF carrier and provides the information to an RX processor 356. A TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by a channel estimator 358. The soft decisions are then decoded and deinterleaved to recover the data and control signals that were originally transmitted by the base station 310 on the physical channel. The data and control signals are then provided to a controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by the channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354 TX. Each transmitter 354 TX may modulate an RF carrier with a respective spatial stream for transmission.

The UL transmission is processed at the base station 310 in a manner similar to that described in connection with the receiver function at the UE 350. Each receiver 318 RX receives a signal through its respective antenna 320. Each receiver 318 RX recovers information modulated onto an RF carrier and provides the information to the RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

Aspects of the transmitter symbol extension and windowing component 198 may be performed by the UE 350 (e.g., by at least one of the TX processor 368, the RX processor 356, and the controller/processor 359) and/or the base station 310 (e.g., by at least one of the TX processor 316, the RX processor 370, and the controller/processor 375).

Aspects of the base station symbol extension and windowing component 199 may be performed by the base station 310 (e.g., by at least one of the TX processor 316, the RX processor 370, and the controller/processor 375).

Figure 4:
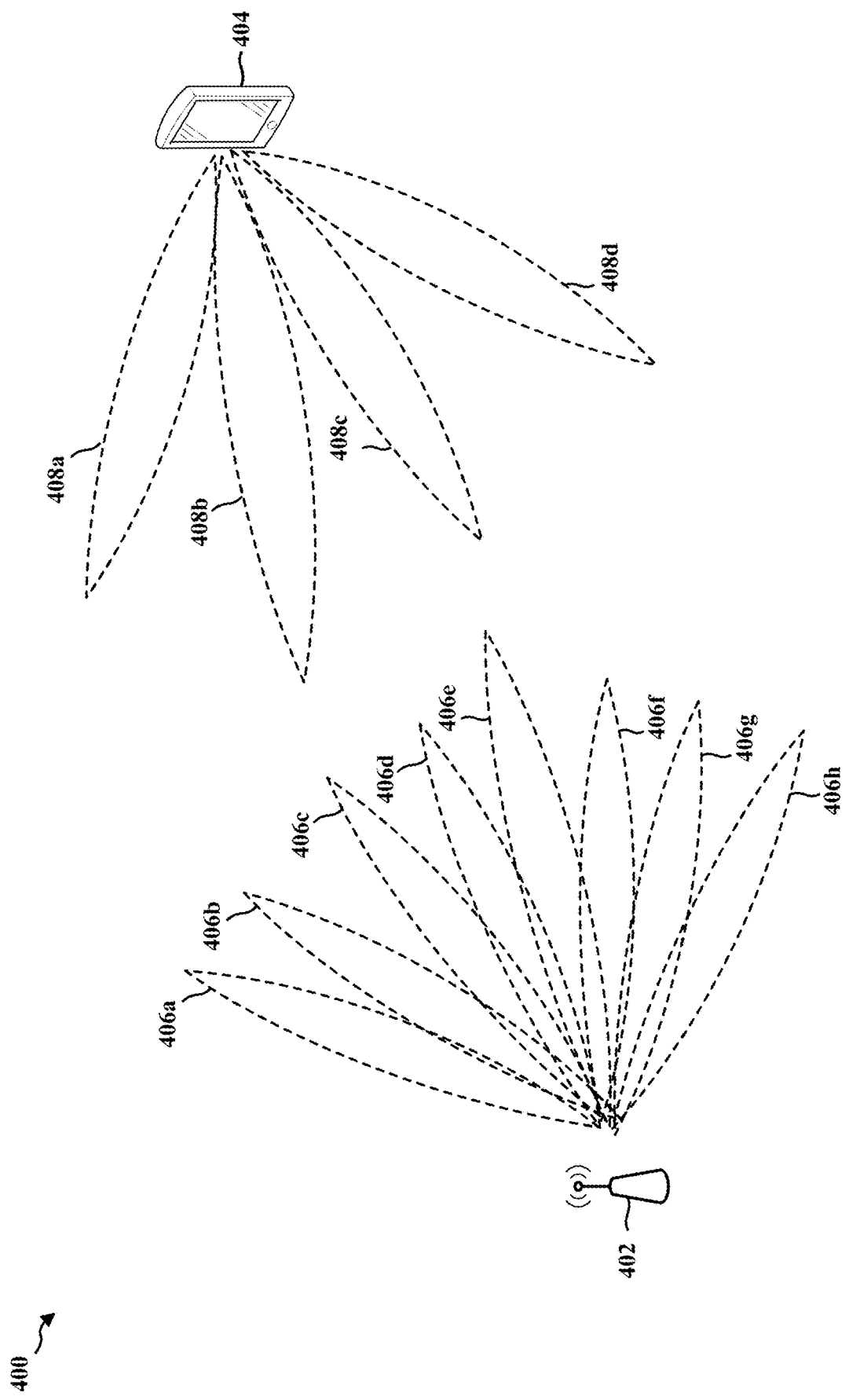
FIG. 4 is a diagram illustrating a base station in communication with a UE.

FIG. 4 is a diagram 400 illustrating a base station 402 in communication with a UE 404. Referring to FIG. 4, the base station 402 may transmit a beamformed signal to the UE 404 in one or more of the directions 406a, 406b, 406c, 406d, 406e, 406f, 406g, 406h. The UE 404 may receive the beamformed signal from the base station 402 in one or more receive directions 408a, 408b, 408c, 408d. The UE 404 may also transmit a beamformed signal to the base station 402 in one or more of the directions 408a-408d. The base station 402 may receive the beamformed signal from the UE 404 in one or more of the receive directions 406a-406h. The base station 402/UE 404 may perform beam training to determine the best receive and transmit directions for each of the base station 402/UE 404. The transmit and receive directions for the base station 402 may or may not be the same. The transmit and receive directions for the UE 404 may or may not be the same.

In some examples, the UE 404 may perform a beam switch (sometimes referred to as a "beam change") to facilitate switching from a first beam to a second beam. For example, the UE 404 may determine to switch from a first transmit beam to a second transmit beam, may determine to switch from a transmit beam to a receive beam, may determine to switch from a receive beam to a transmit beam, or may determine to switch from a first receive beam to a second receive beam.

For example, a parameter may be indicated from the base station 402 to the UE 404 in RRC signaling that provides TCI state information for a CORESET. For example, a parameter indicating that TCI information is present in DCI, such as a "tci-PresentInDCI" parameter may be indicated as being enabled or disabled in the RRC signaling to the UE. If "tci-PresentInDCI" is enabled, the parameter may indicate that the DCI carries TCI state information of a scheduled shared channel. In some examples, the TCI states may be associated with one or more downlink reference signals and a corresponding QCL (quasi co-location) type. For example, QCL-type D may relate to receive beam parameters. In such examples, the UE may select a beam based on the receive beam parameters used for receiving downlink beams configured by DCI.

In some examples, there may be a scheduling offset associated with a duration or a quantity of slots between when the UE 404 receives PDCCH and the transmission/reception of the PDSCH scheduled by the PDCCH. In examples in which the scheduling offset is less than a threshold (e.g., "timeDurationForQCL"), the UE 404 may use a default TCI state to determine the transmit beam or receive beam for the PDSCH. For example, the UE 404 may assume the same QCL property for the DM-RS ports of the PDSCH as that of the CORESET of the lowest ID monitored in the latest slot by the UE 404. In examples in which the scheduling offset is greater than or equal to the threshold, the UE 404 may assume that the DM-RS ports of PDSCH are in QCL with the reference signals in the TCI states indicated by the PDCCH.

When the UE 404 performs a beam switch (e.g., from a first transmit beam to a second transmit beam, from a transmit beam to a receive beam, from a receive beam to a transmit beam, or from a first receive beam to a second receive beam), the UE 404 may incur a delay. For example, performing analog beam switching includes the UE 404 receiving and decoding control information, re-programming RF software and/or firmware, and retuning of RF front ends of the UE 404. When performing pre-configured beam switching, the UE 404 may not perform decoding of control information and re-programming of RF software and/or firmware, but may still perform the retuning of RF front ends of the UE 404. A duration associated with performing the beam switch may be assumed to be accommodated in the "timeDurationForQCL" threshold. In some examples, the beam switch delay may be a few hundred nanoseconds (ns).

In some examples, the beam switch delay may be contained within a cyclic prefix (CP) duration associated with a symbol (e.g., an OFDM symbol) of a beam. The symbols on downlink and/or uplink may be CP-OFDM symbols. Additionally, the subcarrier spacing and symbol length/duration are a function of the numerology. For example, the subcarrier spacing may be equal to $2^\mu*15$ kHz, where $\mu$ is the numerology 0 to 5. As such, the numerology $\mu=0$ has a subcarrier spacing of 15 kHz and the numerology $\mu=5$ has a subcarrier spacing of 480 kHz. The symbol length/duration is inversely related to the subcarrier spacing. FIGS. 2A-2D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 μs.

When operating in FR2, the subcarrier spacing may be 120 kHz. In some such examples, the CP duration may be 586 ns. As a result, in some such instances, the beam switch delay may be contained within the CP duration (e.g., the beam switch delay may be less than the CP duration) and, thus, no additional switching gap or guard time may be required for the successful transmission/reception of a symbol.

However, when operating in higher bands, such as FR4 (e.g., approximately 60 GHz carrier frequency), the subcarrier spacing may be increased to reduce higher levels of phase noise. For example, when operating in FR4, candidate subcarrier spacings include 960 kHz, 1.92 MHz, 3.84 MHz, etc. However, as the symbol length and the CP duration is inversely related with subcarrier spacing, it may be appreciated that as subcarrier spacing increases, the symbol length and the CP duration decreases. For example, for a subcarrier spacing of 960 kHz, the CP duration may be 73 ns, which may be notably shorter than a beam switch delay of one or more hundred nanoseconds.

Figure 5A:
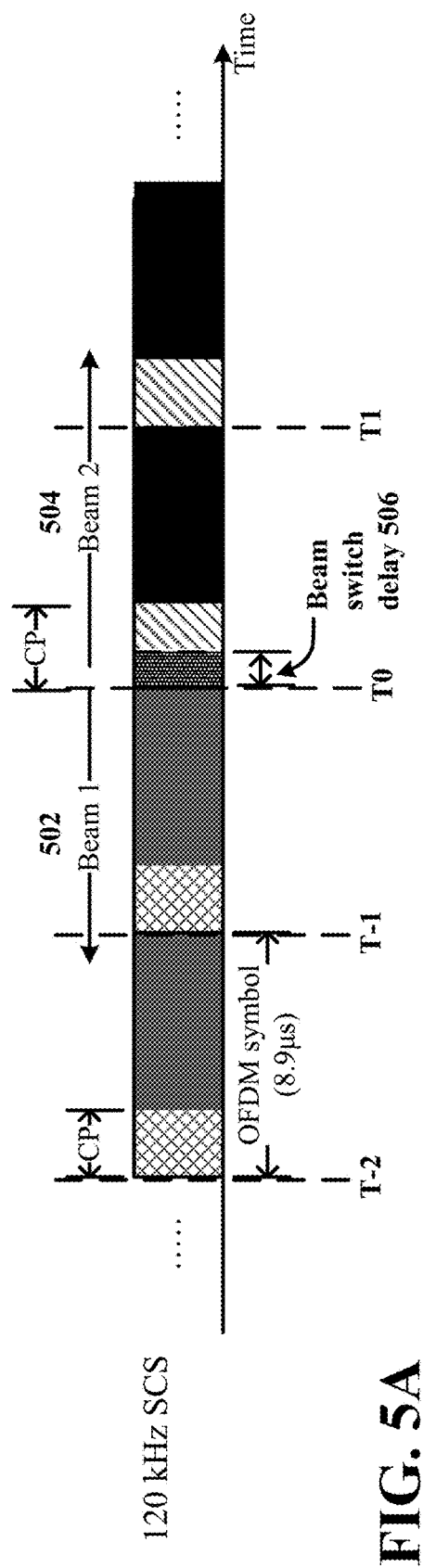
FIG. 5A depicts a portion of beam switching at a first subcarrier spacing, in accordance with one or more techniques disclosed herein.

FIG. 5A depicts a portion of beam switching 500 at a subcarrier spacing (SCS) of 120 kHz. As shown in FIG. 5A, a UE is communicating via a first beam 502 and performs a beam switch to communicate via a second beam 504 at a time T0. With a subcarrier spacing of 120 kHz, a symbol duration is 8.9 microseconds and the CP duration is 580 ns. At time T0, the UE initiates performing the beam switch and incurs a beam switch delay 506. As explained above, when operating with a subcarrier spacing of 120 kHz, the beam switch delay 506 may be contained within the CP duration (e.g., the beam switch delay 506 is less than the CP duration).

Figure 5B:
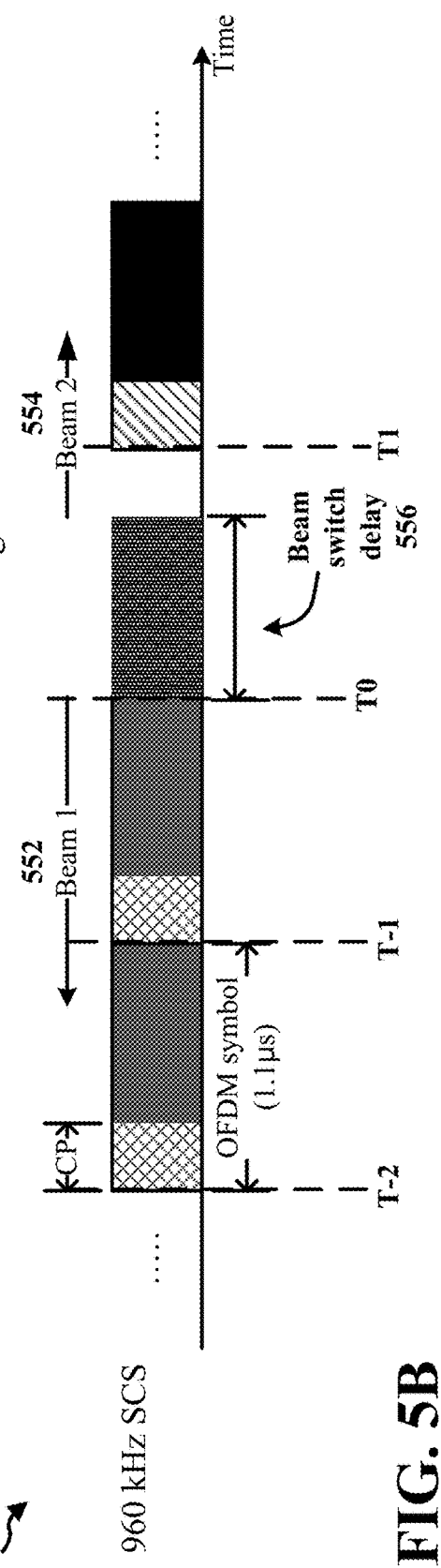
FIG. 5B depicts a portion of beam switching at a second subcarrier spacing, in accordance with one or more techniques disclosed herein.

FIG. 5B depicts a portion of beam switching 550 at a subcarrier spacing of 960 kHz. As shown in FIG. 5B, a UE is communicating via a first beam 552 and performs a beam switch to communicate via a second beam 554 at a time T0. With a subcarrier spacing of 960 kHz, a symbol duration is 1.1 microseconds and the CP duration is 73 ns. At time T0, the UE initiates performing the beam switch and incurs a beam switch delay 556, which may be one or more hundred nanoseconds. In the illustrated example of FIG. 5B, the beam switch delay 556 of one or more hundred nanoseconds is larger than the CP duration. Accordingly, when performing the beam switch, the UE may employ an additional beam switching gap with a length of an integer number of symbols. For example, as shown in FIG. 5B, the UE employs a beam switching gap of one symbol so that the first symbol of the second beam 554 starts at time T1.

It may be appreciated that when the UE is performing a beam switch, the RF front end of the UE may be in an undetermined state and there may be residual signaling. For example, there may be residual radiation associated with some RF emission. In some examples, the residual radiation may lead to out-of-band emission and to adjacent-channel interference. For example, adjacent-channel interference may be caused by extraneous power from a signal in an adjacent channel (e.g., when changing from a first beam to a second beam). Adjacent channel leakage ratio (ACLR) (sometimes referred to as "harmonic distortion") may also increase due to the out-of-band emissions.

In some examples, if the beam switching delay is relatively small compared to the symbol length (e.g., the beam switch delay is contained within the CP duration, as shown in FIG. 5A) and beam switching does not occur frequently, the effect of out-of-band emission may be relatively small or negligible. However, if the beam switching delay is comparable to the symbol length and/or longer than the CP duration (e.g., in instances with relatively high subcarrier spacings, as show in FIG. 5B) and/or beam switching occurs relatively frequently, the effect of out-of-band emission may be measurable and/or consequential. For example, some wireless devices may be required to satisfy spectral mask requirements that measure emitted radiation. In some examples, if beam switching is performed frequently, the duration during which unwanted emissions (e.g., out-of-band emission due to beam switching) increases and, when averaged over time, may not satisfy the spectral mask requirements.

Example aspects disclosed herein provide techniques for reducing residual radiation when performing beam switching by employing symbol extension and windowing. For example, when a UE is performing beam switching, disclosed techniques extend a transmission for an extended period of time and shape the extended transmission during the extended period of time by applying a windowing function to the extended transmission. In some examples, the UE may extend the transmission for one or more symbols after a beam change. In some examples, the UE may extend the transmission for one or more symbols before a beam change. In some examples, the beam change may be an uplink beam change between transmissions of two different channels, such as PUSCH, SRS, and/or PUCCH.

In some examples, the UE may extend a transmission for one or more symbols before a beam change. FIG. 6A depicts an example transmission 600 on which symbol extension and windowing may be performed for one or more symbols prior to a beam change (e.g., is performed on a first symbol of the second beam 554 after switching from the first beam 552 at the time T0 of FIG. 5B). In the illustrated example of FIG. 6A, the UE extends the transmission for at least a first symbol 602 prior to a beam switch. For example, and as shown in FIG. 6A, the UE adds a CP extension 604 prior to a CP duration 606 of the first symbol 602. In this manner, the UE extends the transmission of the cyclic prefix of a first symbol 602. However, extending the transmission of the first symbol 602 by adding the CP extension may also increase residual radiation during the period of the CP extension, for example, prior to the beam switch.

To facilitate reducing the residual radiation associated with adding the CP extension, the UE then shapes the transmission during the extended period of time (e.g., during the CP extension 604) by applying a windowing function 610 to the extended transmission. For example, the windowing function 610 shapes the CP extension 604 by reducing (or zero-ing out) radiation associated with the CP extension 604 outside of the shape of the windowing function 610.

When the UE performs the symbol extending and the shaping, as disclosed herein, the UE may reduce the residual radiation associated with the beam switch. For example, as shown at transmission 620, the windowing function 610 reduces the duration of the CP extension 604 to create the transmission 620 with reduced radiation associated with the CP extension 604.

In some examples, the UE may extend a transmission following a beam change of one or more symbols that were transmitted before a beam change. FIG. 6B depicts an example transmission 650 on which symbol extension and windowing is performed for one or more symbols following a beam change (e.g., extending transmission of a last symbol of the first beam 552 that was transmitted before switching from the first beam 552 to the second beam 554 at the time T0 of FIG. 5B). In the illustrated example of FIG. 6B, the UE extends the transmission of a last symbol 652 of a beam before a beam switch. For example, and as shown in FIG. 6B, the UE adds a repetition 654 of the last symbol 652 after the beam switch. In this manner, the UE extends the transmission of the last symbol 652 by repeating the last symbol after the transmission of the last symbol 652. However, extending the transmission of the last symbol 652 by adding the repetition 654 may also increase residual radiation during the period of the repetition, for example, following the beam switch.

To facilitate reducing the residual radiation associated with adding the repetition, the UE then shapes the transmission during the extended period of time (e.g., during the repetition 654) by applying a windowing function 660 to the extended transmission. For example, the windowing function 660 shapes the repetition 654 by reducing (or zero-ing out) radiation associated with the repetition 654 outside of the shape of the windowing function 660.

When the UE performs the symbol extending and the shaping, as disclosed herein, the UE may reduce the residual radiation associated with the beam switch. For example, as shown at transmission 670, the windowing function 660 reduces the duration of the repetition 654 to create the transmission 670 with reduced radiation associated with the repetition 654.

Although the examples of FIGS. 5A, 5B, 6A, and 6B refer to a UE as the transmitting device, in other examples, the transmitting device may comprise a base station.

Figure 7:
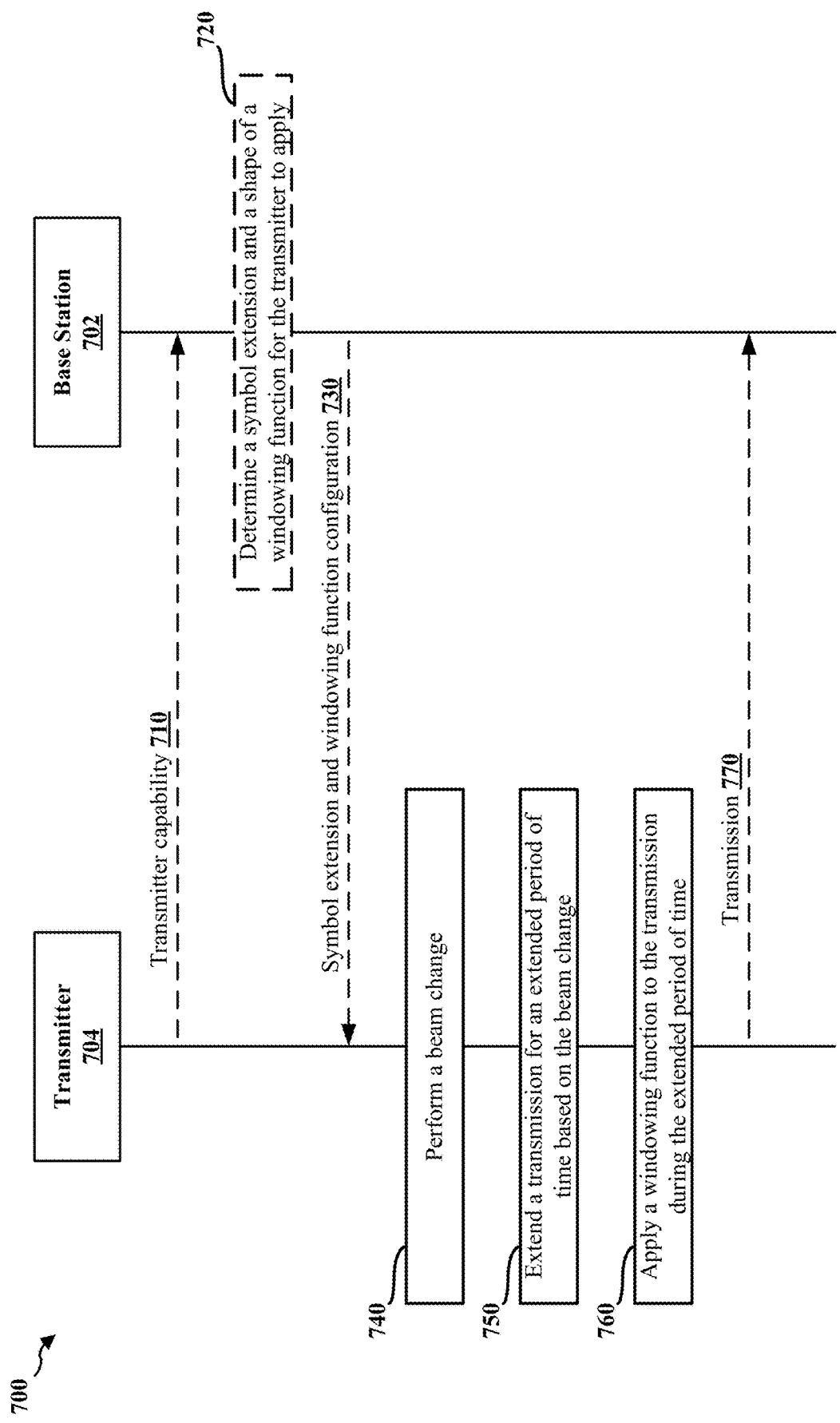
FIG. 7 is an example communication flow between a base station and a transmitter, in accordance with one or more techniques disclosed herein.

FIG. 7 illustrates an example communication flow 700 between a base station 702 and a transmitter 704, as presented herein. In the illustrated example, the communication flow 700 facilitates the transmitter 704 performing symbol extension and shaping to, for example, reduce the residual radiation associated with performing a beam switch. Aspects of the base station 702 may be implemented by the base station 102/180 of FIG. 1, the base station 310 of FIG. 3, and/or the base station 402 of FIG. 4. Aspects of the transmitter 404 may be implemented by a UE (e.g., the UE 104 of FIG. 1, the UE 350 of FIG. 3, and/or the UE 404 of FIG. 4) and/or a base station (e.g., the base station 102/180 of FIG. 1, the base station 310 of FIG. 3, and/or the base station 402 of FIG. 4).

Although not shown in the illustrated example of FIG. 7, it may be appreciated that in additional or alternative examples, the base station 702 may be in communication with one or more other base stations or UEs, and/or the transmitter 704 may be in communication with one or more other base stations or UEs. Thus, while certain of the transmissions between the base station 702 and the transmitter 704 are described as uplink transmissions and downlink transmissions, in other examples, any of the transmissions may additionally or alternatively be sidelink transmissions.

In the illustrated example of FIG. 7, the base station 702 and the transmitter 704 are in communication. For example, the transmitter 704 may transmit transmitter capability information 710 that is received by the base station 702. In some examples, the transmitter capability information 710 may include beam switching capability information of the transmitter 704. For example, the transmitter capability information 710 may indicate a quantity of times (e.g., 4, 7, 14, etc.) that the transmitter 704 is capable of performing beam switching per slot. In some examples, the transmitter capability information 710 may include an RF front end capability of the transmitter 704. For example, the RF front end capability may indicate a hardware delay that the transmitter 704 incurs when performing a beam switch. As described above, in some examples, the RF front end capability may be a few hundred nanoseconds. The transmitter 704 may transmit the transmitter capability information 710 to the base station 702 via an uplink control channel (e.g., PUCCH) and/or an uplink shared channel (e.g., PUSCH).

At 720, the base station 702 may determine a symbol extension and a shape of a windowing function for the transmitter 704 to apply, for example, when performing a beam change. For example, the base station 702 may use the beam switching capability information and/or the RF front end capability of the transmitter 704 to determine whether to configure a length of a symbol extension or a shape of a windowing function for the transmitter 704 to apply when the transmitter 704 is performing a beam change. For example, the base station 702 may determine the duration of the repetition signal that the transmitter 704 is to apply to a last symbol of a first beam (e.g., the last symbol 652 of the beam of FIG. 6B) when performing a beam change from the first beam to a second beam. Additionally or alternatively, the base station 702 may determine the length of CP extension that the transmitter 704 is to apply to a first symbol of the second beam (e.g., the first symbol 602 of the beam of FIG. 6A) when performing a beam change from the first beam to the second beam.

The base station 702 may then configure the transmitter 704 for one or more of the length of the symbol extension or the shape of the windowing function determined at 720. For example, the base station 702 may transmit symbol extension and windowing function configuration information 730 that is received by the transmitter 704. In some examples, the base station 702 may transmit the symbol extension and windowing function configuration information 730 to the transmitter 704 via a downlink shared channel (e.g., PDSCH) and/or a downlink control channel (e.g., PDCCH, such as DCI). However, other examples may employ additional or alternative techniques for configuring the transmitter 704 with the symbol extension and windowing function configuration information 730.

At 740, the transmitter 704 performs a beam change. For example, the transmitter 704 may determine to perform a beam change from a first transmit beam to a second transmit beam, may determine to perform a beam change from a transmit beam to a receive beam, or may determine to perform a beam change from a receive beam to a transmit beam. In some examples, the transmitter 704 may select a beam indicated in DCI. In some examples, the DCI may carry TCI state information (e.g., when a DCI is scheduling a PDSCH and carries the corresponding TCI state information). In some such examples, when the TCI state information is available to the transmitter 704, the transmitter 704 may determine which receive beam to use for receiving the downlink transmission on that beam, which may be QCL'ed with the TCI state information. For example, in a CORE-SET, there may be an option to enable or disable a "tci-PresentInDCI" parameter in the RRC, which indicates whether the DCI carries TCI state information of a scheduled shared channel. In some examples, the TCI states may be associated with one or more DL reference signals and a corresponding QCL (quasi co-location) type. For example, QCL-type D may relate to receive beam parameters. In such examples, the transmitter 704 may select a beam based on the receive beam parameters used for receiving downlink beams configured by DCI.

At 750, the transmitter 704 extends a transmission for an extended period of time based on the beam change. The extension may be applied before and/or after the beam switch. In some examples, the transmitter 704 may extend a transmission for the extended period of time by extending a cyclic prefix (CP) duration for one or more symbols of a beam, for example, prior to the beam switch. For example, for a new beam (e.g., to which the transmitter is changing), the transmitter 704 may add a CP extension to a CP duration for a first symbol of the new beam so that the total CP duration associated with the first symbol is relatively longer than when no CP extension is applied. In some examples, the transmitter 704 may determine the duration of the CP extension based on the symbol extension and windowing function configuration information 730 received from the base station 702.

In some examples, the transmitter 704 may extend a transmission on the first beam for the extended period of time following a beam change by adding a repetition of one or more symbols of a beam. For example, for the first beam (e.g., before the beam change), the transmitter 704 may add a repetition of the last symbol of the first beam. In some examples, the transmitter 704 may determine the repetition based on the symbol extension and windowing function configuration information 730 received from the base station 702.

In some examples, the transmitter 704 may extend a transmission for a first beam and may extend a CP duration for the second beam when performing a beam switch.

In some examples, the transmitter 704 may determine whether to extend the transmission for the extended period of time by extending at least the first symbol of the new beam or by extending at least the last symbol of the prior beam based on the symbol extension and windowing function configuration information 730 received from the base station 702. In some examples, the transmitter 704 may determine to extend the transmission for the extended period of time by extending at least the first symbol of the new beam. In some examples, the transmitter 704 may determine to extend the transmission for the extended period of time by extending at least the last symbol of the new beam. In some examples, the transmitter 704 may determine to extend the transmission for the extended period of time by extending at least the first symbol of the new beam and by extending at least the last symbol of the old beam.

At 760, the transmitter 704 applies a windowing function to a transmission 770 during the extended period of time. For example, when the transmitter 704 extends the transmission 770 by extending at least the first symbol of the new beam, the transmitter 704 may apply a windowing function to the CP extension associated with the first symbol of the new beam. When the transmitter 704 extends the transmission 770 by extending at least the last symbol of the old beam, the transmitter 704 may apply a windowing function to the repetition associated with the last symbol of the old beam.

In some examples, the transmitter 704 may determine the windowing function to apply to the transmission 770 during the extended period based on the symbol extension and windowing function configuration information 730 received from the base station 702.

Although not shown in FIG. 7, it may be appreciated that in some examples, the base station 702 may determine, at 720, not to configure a length of a symbol extension and/or a shape of a windowing function for the transmitter 704 to apply when performing a beam change. For example, the transmitter capability information 710 received from the transmitter 704 may indicate that the quantity of times that the transmitter 704 is capable of performing beam switching per slot (e.g., 4, 7, 14, etc.) is relatively low and/or the hardware delay that the transmitter 704 may incur when performing a beam switch is relatively low. In some such examples, the base station 702 may determine that the quantity of out-of-band emission (e.g., residual radiation) that the transmitter 704 is likely to radiate while performing a beam switch may satisfy a spectral mask requirement. Accordingly, based on the beam switching capability information and/or the RF front end capability provided by the transmitter 704 via the transmitter capability information 710, the base station 702 may determine not to configure a length of a symbol extension and/or a shape of a windowing function for the transmitter 704 to apply when performing a beam change. In some such examples, the transmitter 704 may perform the beam change, at 740, without also extending the transmission 770 for an extended period of time and/or without applying a windowing function to the transmission 770 during the extended period of time.

Although the example of FIG. 7 includes the transmitter 704 providing capabilities (e.g., the transmitter capability information 710), receiving a configuration (e.g., the symbol extension and windowing function configuration information 730), and communicating a transmission with the base station 702 (e.g., the transmission 770), in other examples, the transmitter 704 may communicate the transmission with a UE. For example, the transmitter 704 may apply the transmission extension and the windowing function, based on the symbol extension and windowing function configuration information 730, when communicating the transmission 770 with a UE.

Figure 8:
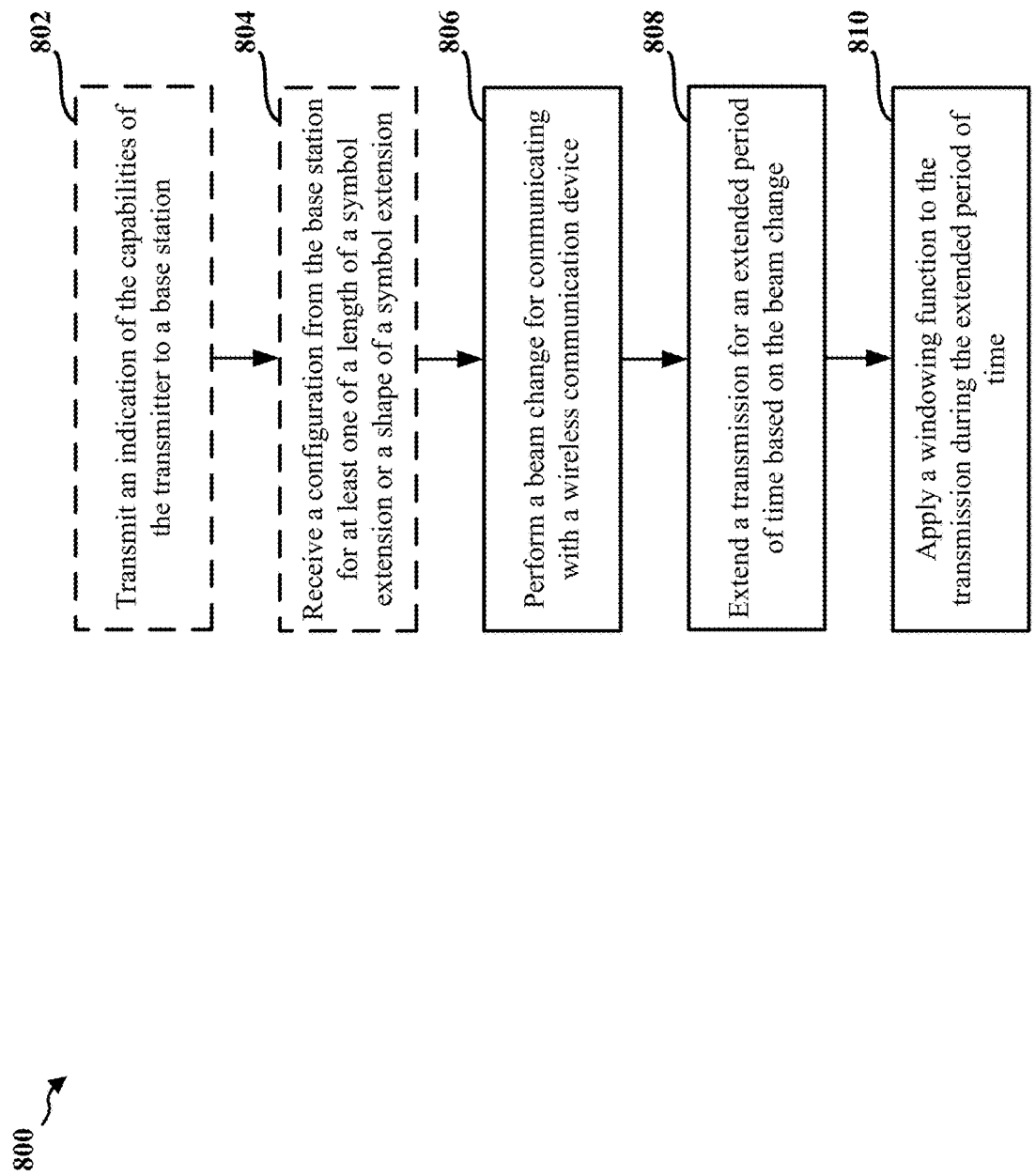
FIG. 8 is a flowchart of a method of wireless communication at a transmitter, in accordance with the teachings disclosed herein.

FIG. 8 is a flowchart 800 of a method of wireless communication. The method may be performed by a wireless transmitter (e.g., the transmitter 704 and/or the apparatus 902 of FIG. 9). Aspects of the wireless transmitter may be implemented by a UE (e.g., the UE 104, the UE 350, and/or the UE 404) or a base station (e.g., the base station 102/180, the base station 310, and/or the base station 402). Optional aspects are illustrated with a dashed line. The method may enable a transmitter or other wireless device to reduce residual radiation during beam switching.

At 806, the transmitter performs a beam change for communicating with a wireless communication device, as described above in connection with, for example, 740 of FIG. 7, and/or as described in connection with FIGS. 4-6B. For example, 806 may be performed by a beam change component 940 of the apparatus 902 of FIG. 9. In some examples, the wireless communication device may comprise a base station. In some examples, the wireless communication device may comprise a UE for sidelink communication.

At 808, the transmitter extends a transmission for an extended period of time based on the beam change, as described above in connection with, for example, 750 of FIG. 7, with the CP extension 604 of FIG. 6A, and/or with the repetition 654 of FIG. 6B. For example, 808 may be performed by a transmission extension component 942 of the apparatus 902 of FIG. 9.

In some examples, the extended period of time may include one or more symbols for the transmission. In some examples, the transmitter may extend the transmission for one or more symbols after the beam change, for example, as described in connection with FIG. 6B. In some such examples, a repetition may be transmitted during the one or more symbols after the beam change. In some examples, the transmitter may extend the transmission for one or more symbols prior to the beam change, for example, as described in connection with FIG. 6A. In some such examples, an extended cyclic prefix may be transmitted during the one or more symbols prior to the beam change At 810, the transmitter applies a windowing function to the transmission during the extended period of time, as described above in connection with, for example, 760 of FIG. 7, with the windowing function 610 of FIG. 6A, and/or with the windowing function 660 of FIG. 6B. For example, 810 may be performed by a windowing function component 944 of the apparatus 902 of FIG. 9.

In some examples, the transmission may be extended and/or the windowing function may be applied to the transmission based on a subcarrier spacing of the transmission. In some examples, the transmission may be extended and/or the windowing function may be applied to the transmission based on the capabilities of the transmitter. For example, at 802, the transmitter may transmit an indication of the capabilities of the transmitter to the base station, as described above in connection with, for example, the transmitter capability information 710 of FIG. 7. For example, 802 may be performed by a capability component 946 of the apparatus 902 of FIG. 9. In some examples, the transmitter capability may include a beam switching capability. In some examples, the transmitter capability may include an RF front end capability.

At 804, the transmitter may receive a configuration from the base station for at least one of a length of a symbol extension or a shape of a symbol extension, as described above in connection with, for example, the symbol extension and windowing function configuration information 730 of FIG. 7. For example, 804 may be performed by a configuration component 948 of the apparatus 902 of FIG. 9.

Figure 9:
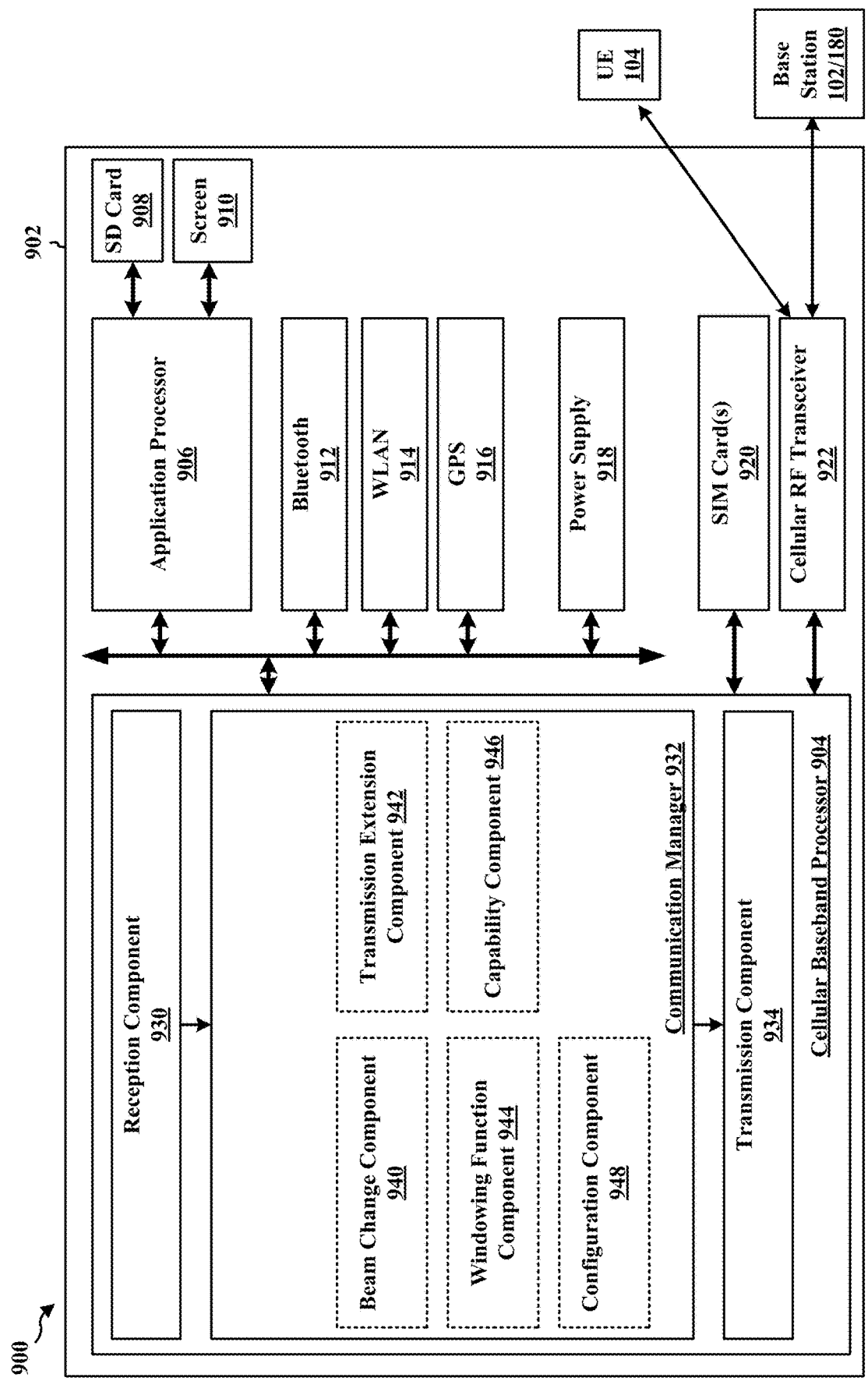
FIG. 9 is a diagram illustrating an example of a hardware implementation for an example apparatus, in accordance with the teachings disclosed herein.

FIG. 9 is a diagram 900 illustrating an example of a hardware implementation for an apparatus 902. The apparatus 902 is a wireless transmitter. and includes a cellular baseband processor 904 (also referred to as a modem) coupled to a cellular RF transceiver 922. In some aspects, the apparatus 902 may be a UE 104 or a base station 102 or 180. In some aspects, the apparatus may include additional components for wireless communication, including any combination of one or more subscriber identity modules (SIM) cards 920, an application processor 906 coupled to a secure digital (SD) card 908 and a screen 910, a Bluetooth module 912, a wireless local area network (WLAN) module 914, a Global Positioning System (GPS) module 916, and/or a power supply 918. The cellular baseband processor 904 communicates through the cellular RF transceiver 922 with the UE 104 and/or base station 102/180. The cellular baseband processor 904 may include a computer-readable medium/memory. The computer-readable medium/memory may be non-transitory. The cellular baseband processor 904 is responsible for general processing, including the execution of software stored on the computer-readable medium/memory. The software, when executed by the cellular baseband processor 904, causes the cellular baseband processor 904 to perform the various functions described supra. The computer-readable medium/memory may also be used for storing data that is manipulated by the cellular baseband processor 904 when executing software. The cellular baseband processor 904 further includes a reception component 930, a communication manager 932, and a transmission component 934. The communication manager 932 includes the one or more illustrated components. The components within the communication manager 932 may be stored in the computer-readable medium/memory and/or configured as hardware within the cellular baseband processor 904. The cellular baseband processor 904 may be a component of the UE 350 and may include the memory 360 and/or at least one of the TX processor 368, the RX processor 356, and the controller/processor 359. In one configuration, the apparatus 902 may be a modem chip and include just the baseband processor 904, and in another configuration, the apparatus 902 may be the entire UE (e.g., see the UE 350 of FIG. 3) and include the additional modules of the apparatus 902. The cellular baseband processor 904 may be a component of the base station 310 and may include the memory 376 and/or at least one of the TX processor 316, the RX processor 370, and the controller/processor 375. In one configuration, the apparatus 902 may be a modem chip and include just the baseband processor 904, and in another configuration, the apparatus 902 may be the entire base station (e.g., see the base station 310 of FIG. 3) and include the additional modules of the apparatus 902.

The communication manager 932 includes a beam change component 940 that is configured to perform a beam change for communicating with a base station, for example, as described in connection with 806 of FIG. 8. The communication manager 932 also includes a transmission extension component 942 that is configured to extend a transmission for an extended period of time based on the beam change, for example, as described in connection with 808 of FIG. 8. The communication manager 932 also includes a windowing function component 944 that is configured to apply a windowing function to the transmission during the extended period of time, for example, as described in connection with 810 of FIG. 8. The communication manager 932 also includes a capability component 946 that is configured to transmit an indication of the capabilities of the transmitter to the base station, for example, as described in connection with 802 of FIG. 8. The communication manager 932 also includes a configuration component 948 that is configured to receive a configuration from the base station for at least one of a length of a symbol extension or a shape of a symbol extension, for example, as described in connection with 804 of FIG. 8.

The apparatus may include additional components that perform each of the blocks of the algorithm in the aforementioned flowchart of FIG. 8. As such, each block in the aforementioned flowchart of FIG. 8 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 902, and in particular the cellular baseband processor 904, includes means for performing a beam change for communicating with a wireless communication device. The example apparatus 902 also includes means for extending a transmission for an extended period of time based on the beam change. The example apparatus 902 also includes means for applying a windowing function to the transmission during the extended period of time.

In another configuration, the example apparatus 902 also includes means for extending the transmission for one or more symbols after the beam change.

The example apparatus 902 also includes means for transmitting a repetition during the one or more symbols after the beam change.

In another configuration, the example apparatus 902 also includes means for extending the transmission for one or more symbols prior to the beam change.

In another configuration, the example apparatus 902 also includes means for transmitting an indication of the transmitter capability to a base station.

In another configuration, the example apparatus 902 also includes means for receiving a configuration from a base station for at least one of a length of a symbol extension or a shape of the windowing function, wherein the transmission is extended based on the length of the symbol extension and the windowing function is applied based on the shape in the configuration from the base station.

The aforementioned means may be one or more of the aforementioned components of the apparatus 902 configured to perform the functions recited by the aforementioned means. As described supra, in some examples, the apparatus 902 may include the TX processor 368, the RX processor 356, and the controller/processor 359. As such, in one configuration, the aforementioned means may be the TX processor 368, the RX processor 356, and the controller/ processor 359 configured to perform the functions recited by the aforementioned means. In some examples, the apparatus 1102 may include the TX processor 316, the RX processor 370, and the controller/processor 375. As such, in one configuration, the aforementioned means may be the TX processor 316, the RX processor 370, and the controller/processor 375 configured to perform the functions recited by the aforementioned means.

Figure 10:
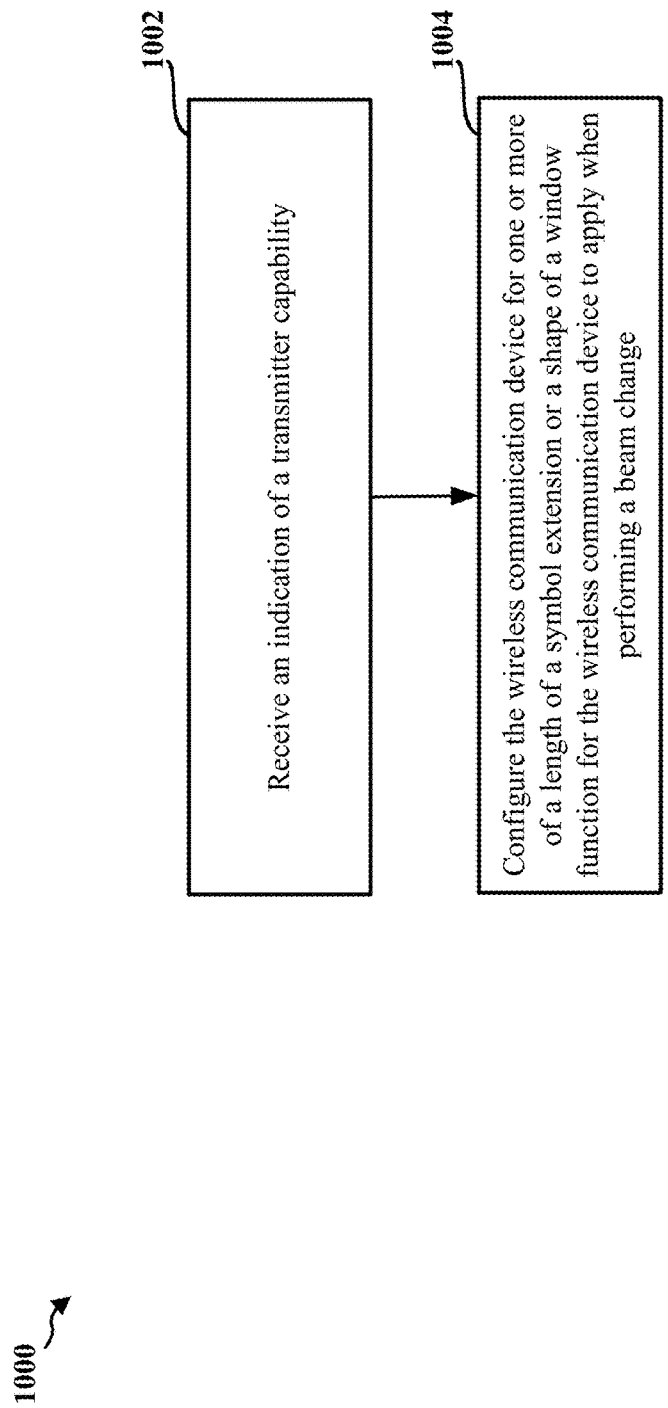
FIG. 10 is a flowchart of a method of wireless communication at a base station, in accordance with the teachings disclosed herein.

FIG. 10 is a flowchart 1000 of a method of wireless communication. The method may be performed by a base station (e.g., the base station 102/180, the base station 310, and/or an apparatus 1102 of FIG. 11). Optional aspects are illustrated with a dashed line. The method may enable a base station or other wireless device to reduce residual radiation during beam switching.

At 1002, the base station receives an indication of a transmitter capability, as described above in connection with, for example, the transmitter capability information 710 of FIG. 7. For example, 1002 may be performed by a capability component 1140 of the apparatus 1102 of FIG. 11. In some examples, the transmitter capability may include a beam switching capability for a wireless communication device. In some examples, the transmitter capability may include an RF front end capability for the wireless communication device.

At 1004, the base station configures the wireless communication device for one or more of a length of a symbol extension or a shape of a windowing function for the transmitter to apply when performing a beam change, as described above in connection with, for example, 720 of FIG. 7 and the symbol extension and windowing function configuration information 730 of FIG. 7. For example, 1004 may be performed by a configuration component 1142 of the apparatus 1102 of FIG. 11. In some examples, the base station may configure the wireless communication device for the length of the symbol extension for the wireless communication device to apply when performing a beam change. In some examples, the base station may configure the wireless communication device for the shape of the windowing function for the wireless communication device to apply when performing a beam change.

Figure 11:
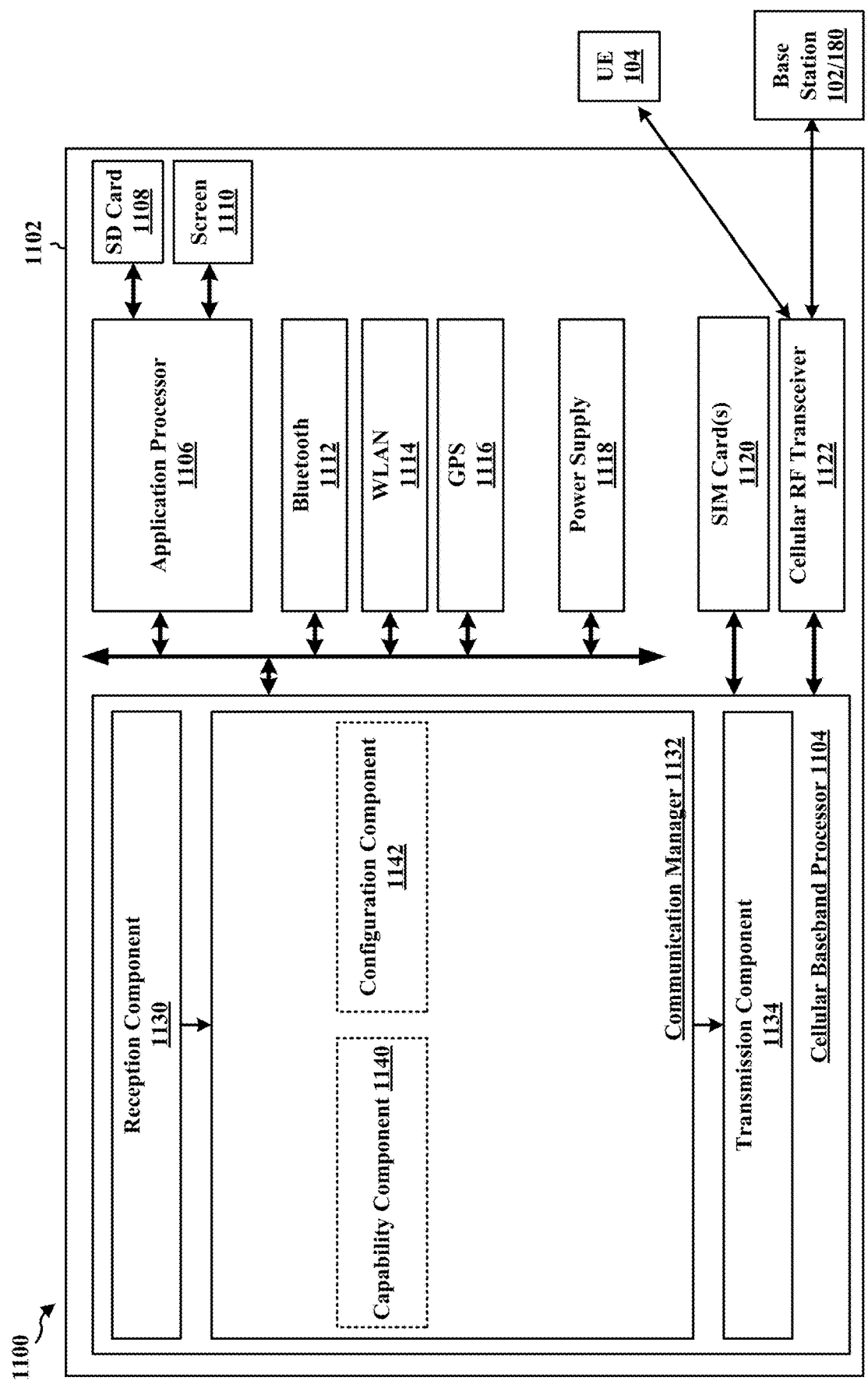
FIG. 11 is a diagram illustrating an example of a hardware implementation for an example apparatus, in accordance with the teachings disclosed herein.

FIG. 11 is a diagram 1100 illustrating an example of a hardware implementation for an apparatus 1102. The apparatus 1102 is a base station and includes a baseband unit 1104. The baseband unit 1104 may communicate through a cellular RF transceiver 1122 with the UE 104. The baseband unit 1104 may include a computer-readable medium/memory. The baseband unit 1104 is responsible for general processing, including the execution of software stored on the computer-readable medium/memory. The software, when executed by the baseband unit 1104, causes the baseband unit 1104 to perform the various functions described supra. The computer-readable medium/memory may also be used for storing data that is manipulated by the baseband unit 1104 when executing software. The baseband unit 1104 further includes a reception component 1130, a communication manager 1132, and a transmission component 1134. The communication manager 1132 includes the one or more illustrated components. The components within the communication manager 1132 may be stored in the computer-readable medium/memory and/or configured as hardware within the baseband unit 1104. The baseband unit 1104 may be a component of the base station 310 and may include the memory 376 and/or at least one of the TX processor 316, the RX processor 370, and the controller/processor 375.

The communication manager 1132 includes a capability component 1140 that is configured to receive an indication of a transmitter capability, for example, as described in connection with 1002 of FIG. 10. The communication manager 1132 also includes a configuration component 1142 that is configured to configure the transmitter for one or more of a length of a symbol extension or a shape of a windowing function for the transmitter to apply when performing a beam change, for example, as described in connection with 1004 of FIG. 10.

The apparatus may include additional components that perform each of the blocks of the algorithm in the aforementioned flowchart of FIG. 10. As such, each block in the aforementioned flowchart of FIG. 10 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1102, and in particular the baseband unit 1104, includes means for receiving an indication of a transmitter capability of a wireless communication device, the transmitter capability comprising at least one of a beam switching capability for wireless communication device or an RF front end capability for the wireless communication device. The example apparatus 1102 also includes means for configuring the wireless communication device for one or more of a length of a symbol extension or a shape of a windowing function for the wireless communication device to apply when performing a beam change.

In another configuration, the example apparatus 1102 also includes means for configuring the wireless communication device for the length of the symbol extension for the wireless communication device to apply when performing a beam change.

In another configuration, the example apparatus 1102 also includes means for configuring the wireless communication device for the shape of the windowing function for the wireless communication device to apply when performing a beam change.

The aforementioned means may be one or more of the aforementioned components of the apparatus 1102 configured to perform the functions recited by the aforementioned means. As described supra, the apparatus 1102 may include the TX processor 316, the RX processor 370, and the controller/processor 375. As such, in one configuration, the aforementioned means may be the TX processor 316, the RX processor 370, and the controller/processor 375 configured to perform the functions recited by the aforementioned means.

Example aspects disclosed herein provide techniques for reducing residual radiation when performing beam switching by employing symbol extension and windowing. For example, when a transmitter is performing beam switching, disclosed techniques extend a transmission for an extended period of time and shape the extended transmission during the extended period of time by applying a windowing function to the extended transmission. In some examples, the transmitter may extend the transmission for one or more symbols after a beam change. In some examples, the transmitter may extend the transmission for one or more symbols before a beam change. In some examples, the beam change may be an uplink beam change between transmissions of two different channels, such as PUSCH, SRS, and/or PUCCH.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is a method of wireless communication at a UE, comprising: performing a beam change for communicating with a base station; extending a transmission for an extended period of time based on the beam change; and applying a windowing function to the transmission during the extended period of time.

Aspect 2 is the method of aspect 1, further including that the extended period of time comprises one or more symbols for the transmission.

Aspect 3 is the method of any of aspect 1 or aspect 2, further including that the transmission is extended for one or more symbols after the beam change.

Aspect 4 is the method of any of aspects 1 to 3, further including that a repetition is transmitted during the one or more symbols after the beam change.

Aspect 5 is the method of any of aspects 1 to 4, further including that the transmission is extended for one or more symbols prior to the beam change.

Aspect 6 is the method of any of aspects 1 to 5, further including that an extended cyclic prefix is transmitted during the one or more symbols prior to the beam change.

Aspect 7 is the method of any of aspects 1 to 6, further including that the transmission is extended and the windowing function is applied to the transmission further based on a subcarrier spacing of the transmission.

Aspect 8 is the method of any of aspects 1 to 7, further including that the transmission is extended and the windowing function is applied further based on a UE capability.

Aspect 9 is the method of any of aspects 1 to 8, further including that the UE capability comprises at least one of a beam switching capability or an RF front end capability.

Aspect 10 is the method of any of aspects 1 to 9, further including: transmitting an indication of the UE capability to the base station.

Aspect 11 is the method of any of aspects 1 to 10, further including: receiving a configuration from the base station for at least one of a length of a symbol extension or a shape of the windowing function, wherein the UE extends the transmission based on the length of the symbol extension and applies the shape of the windowing function in the configuration from the base station.

Aspect 12 is an apparatus for wireless communication including a memory and at least one processor coupled to a memory, the memory and the at least one processor configured to implement a method as in any of aspects 1 to 11.

Aspect 13 is an apparatus for wireless communication including means for implementing a method as in any of aspects 1 to 11.

Aspect 14 is a non-transitory computer-readable storage medium storing computer executable code, where the code, when executed, causes a processor to implement a method as in any of aspects 1 to 11.

Aspect 15 is a method of wireless communication at a base station, comprising: receiving an indication of a UE capability, wherein the UE capability comprises at least one of a beam switching capability for a UE or an RF front end capability for the UE; and configuring the UE for one or more of a length of a symbol extension or a shape of a windowing function for the UE to apply when performing a beam change.

Aspect 16 is the method of aspect 15, further including that the base station configures the UE for the length of the symbol extension for the UE to apply when performing a beam change.

Aspect 17 is the method of any of aspect 15 or aspect 16, further including that the base station configures the UE for the shape of the windowing function for the UE to apply when performing a beam change.

Aspect 18 is an apparatus for wireless communication including a memory and at least one processor coupled to a memory, the memory and the at least one processor configured to implement a method as in any of aspects 15 to 17.

Aspect 19 is an apparatus for wireless communication including means for implementing a method as in any of aspects 15 to 17.

Aspect 20 is a non-transitory computer-readable storage medium storing computer executable code, where the code, when executed, causes a processor to implement a method as in any of aspects 15 to 17.

Aspect 21 is a method of wireless communication at a transmitter, comprising: performing a beam change for communicating with a wireless communication device; extending a transmission for an extended period of time based on the beam change; and applying a windowing function to the transmission during the extended period of time.

Aspect 22 is the method of aspect 21, further including that the extended period of time comprises one or more symbols for the transmission.

Aspect 23 is the method of any of aspect 21 or aspect 22, further including that extending the transmission includes extending the transmission for one or more symbols after the beam change.

Aspect 24 is the method of any of aspects 21 to 23, further including that extending the transmission includes transmitting a repetition during the one or more symbols after the beam change.

Aspect 25 is the method of any of aspects 21 to 24, further including that extending the transmission includes extending the transmission for one or more symbols prior to the beam change.

Aspect 26 is the method of any of aspects 21 to 25, further including that the transmission that is transmitted during the one or more symbols prior to the beam change includes an extended cyclic prefix.

Aspect 27 is the method of any of aspects 21 to 26, further including that the transmission is extended and the windowing function is applied to the transmission further based on a subcarrier spacing of the transmission.

Aspect 28 is the method of any of aspects 21 to 27, further including that the transmission is extended and the windowing function is applied further based on a transmitter capability of the transmitter.

Aspect 29 is the method of any of aspects 21 to 28, further including that the transmitter capability comprises at least one of a beam switching capability or an RF front end capability.

Aspect 30 is the method of any of aspects 21 to 29, further including: transmitting an indication of the transmitter capability to a base station.

Aspect 31 is the method of any of aspects 21 to 30, further including: receiving a configuration from a base station for at least one of a length of a symbol extension or a shape of the windowing function, wherein the transmission is extended based on the length of the symbol extension and the windowing function is applied based on the shape in the configuration from the base station Aspect 32 is the method of any of aspects 21 to 31, further including that the transmitter comprises at least one of a UE and a base station.

Aspect 33 is an apparatus for wireless communication including a memory and at least one processor coupled to a memory, the memory and the at least one processor configured to implement a method as in any of aspects 21 to 32.

Aspect 34 is an apparatus for wireless communication including means for implementing a method as in any of aspects 21 to 32.

Aspect 35 is a non-transitory computer-readable storage medium storing computer executable code, where the code, when executed, causes a processor to implement a method as in any of aspects 21 to 32.

Aspect 36 is a method of wireless communication at a base station, comprising: receiving an indication of a transmitter capability of a wireless communication device, wherein the transmitter capability comprises at least one of a beam switching capability for wireless communication device or an RF front end capability for the wireless communication device; and configuring the wireless communication device for one or more of a length of a symbol extension or a shape of a windowing function for the wireless communication device to apply when performing a beam change.

Aspect 37 is the method of aspect 36, further including that the base station configures the wireless communication for the length of the symbol extension for the wireless communication device to apply when performing a beam change.

Aspect 38 is the method of any of aspect 36 or aspect 37, further including that the base station configures the wireless communication device for the shape of the windowing function for the wireless communication device to apply when performing a beam change.

Aspect 39 is an apparatus for wireless communication including a memory and at least one processor coupled to a memory, the memory and the at least one processor configured to implement a method as in any of aspects 36 to 38.

Aspect 40 is an apparatus for wireless communication including means for implementing a method as in any of aspects 36 to 38.

Aspect 41 is a non-transitory computer-readable storage medium storing computer executable code, where the code, when executed, causes a processor to implement a method as in any of aspects 36 to 38.

What is claimed is:

1. An apparatus for wireless communication, comprising:
a memory; and
at least one processor coupled to the memory, wherein the at least one processor is configured to:
receive a configuration from a base station for at least one of a length of a symbol extension or a shape of a windowing function;
perform a beam change for communication with a wireless communication device;
extend, before or after the beam change, a transmission for an extended period of time based on the length of the symbol extension; and
apply the windowing function to the transmission during the extended period of time based on the shape of the windowing function.

2. The apparatus of claim 1, wherein the extended period of time comprises one or more symbols for the transmission.

3. The apparatus of claim 1, wherein to extend the transmission, the at least one processor is configured to extend the transmission for one or more symbols after the beam change.

4. The apparatus of claim 3, wherein to extend the transmission, the at least one processor is configured to transmit a repetition during the one or more symbols after the beam change.

5. The apparatus of claim 1, wherein to extend the transmission, the at least one processor is configured to extend the transmission for one or more symbols prior to the beam change.

6. The apparatus of claim 5, wherein the transmission includes an extended cyclic prefix.

7. The apparatus of claim 1, wherein to extend the transmission and apply the windowing function, the at least one processor is configured to extend the transmission and apply the windowing function based on a subcarrier spacing of the transmission.

8. The apparatus of claim 1, wherein to extend the transmission and apply the windowing function, the at least one processor is configured to extend the transmission and apply the windowing function based on a transmission capability of the apparatus.

9. The apparatus of claim 8, wherein the transmission capability comprises at least one of a beam switching capability or a Radio Frequency (RF) front end capability.

10. The apparatus of claim 8, wherein the at least one processor is configured to:
transmit an indication of the transmission capability to the base station.

11. The apparatus of claim 1, wherein the apparatus is a user equipment (UE) or a second base station.

12. A method of wireless communication performed by an apparatus, comprising:
receiving a configuration from a base station for at least one of a length of a symbol extension or a shape of a windowing function;
performing a beam change for communicating with a wireless communication device;
extending, before or after the beam change, a transmission for an extended period of time based on the length of the symbol extension; and
applying the windowing function to the transmission during the extended period of time based on the shape of the windowing function.

13. The method of claim 12, wherein the extended period of time comprises one or more symbols for the transmission.

14. The method of claim 12, wherein extending the transmission includes extending the transmission for one or more symbols after the beam change.

15. The method of claim 14, wherein extending the transmission includes transmitting a repetition during the one or more symbols after the beam change.

16. The method of claim 12, wherein extending the transmission includes extending the transmission for one or more symbols prior to the beam change.

17. The method of claim 16, wherein the transmission includes an extended cyclic prefix.

18. The method of claim 12, wherein extending the transmission and applying the windowing function are based on a subcarrier spacing of the transmission.

19. The method of claim 12, wherein extending the transmission and applying the windowing function are based on a transmission capability of the apparatus.

20. The method of claim 19, wherein the transmission capability comprises at least one of a beam switching capability or a Radio Frequency (RF) front end capability.

21. The method of claim 19, further comprising:
transmitting an indication of the transmission capability to the base station.

22. The method of claim 12, wherein the apparatus is a user equipment (UE) or a second base station.

23. An apparatus for wireless communication, comprising:
a memory; and
at least one processor coupled to the memory, wherein the at least one processor is configured to:
receive an indication of a transmitter capability of a wireless communication device, wherein the transmitter capability comprises at least one of a beam switching capability for the wireless communication device or a Radio Frequency (RF) front end capability for the wireless communication device; and
configure the wireless communication device for one or more of a length of a symbol extension or a shape of a windowing function for the wireless communication device to apply for a beam change.

24. The apparatus of claim 23, wherein the at least one processor is configured to configure the wireless communication device for the length of the symbol extension to apply for the beam change.

25. The apparatus of claim 23, wherein the at least one processor is configured to configure the wireless communication device for the shape of the windowing function to apply for the beam change.

26. A method of wireless communication performed by a base station, comprising:
receiving an indication of a transmitter capability of a wireless communication device, wherein the transmitter capability comprises at least one of a beam switching capability for the wireless communication device or a Radio Frequency (RF) front end capability for the wireless communication device; and
configuring the wireless communication device for one or more of a length of a symbol extension or a shape of a windowing function for the wireless communication device to apply for a beam change.

27. The method of claim 26, further comprising:
configuring the wireless communication device for the length of the symbol extension for the wireless communication device to apply for the beam change.

28. The method of claim 26, further comprising:
configuring the wireless communication device for the shape of the windowing function for the wireless communication device to apply for the beam change.

* * * * *